May 13, 1958 C. E. YOST 2,834,342
SURGICAL DEVICE FOR THE FIXATION OF FRACTURED BONES
Filed Aug. 29, 1956
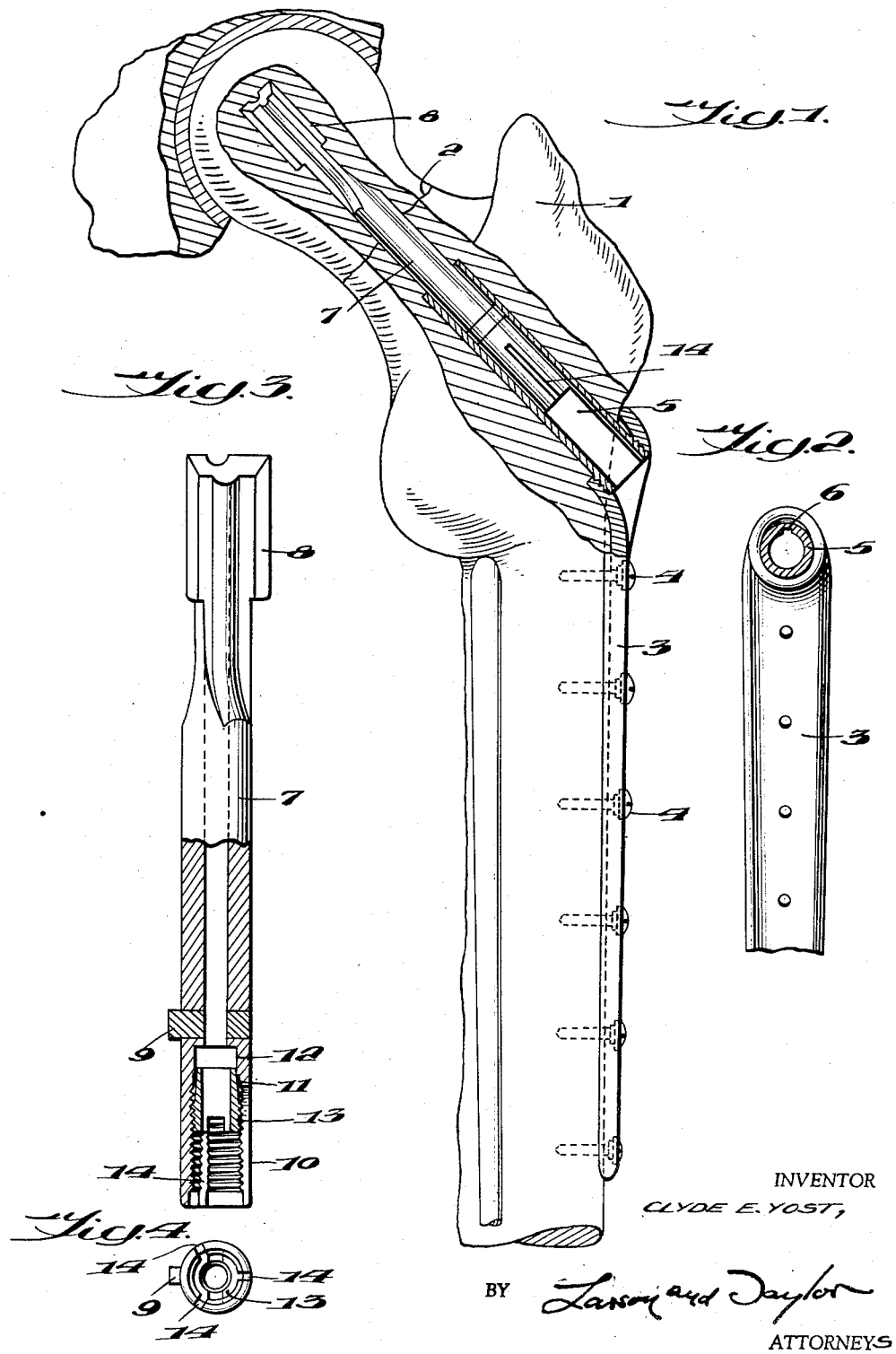
INVENTOR
CLYDE E. YOST,
BY Larson and Taylor
ATTORNEYS

United States Patent Office 2,834,342
Patented May 13, 1958

2,834,342
SURGICAL DEVICE FOR THE FIXATION OF FRACTURED BONES

Clyde E. Yost, Evansville, Ind.

Application August 29, 1956, Serial No. 606,838

3 Claims. (Cl. 128—92)

This invention relates to a surgical device for setting fractured bones and more specifically the invention relates to an improvement on the structure shown in Patent 2,702,543 issued February 22, 1955.

In the above-referred to patent, a surgical fracture fixation device for the hips is disclosed. In such devices there is provided a guide element which is secured to a bone and a nail element which is forced through the guide element to retain the bone fragments in set position. In that patent there is described in detail the necessity for providing means to permit relative movement between the guide means and the nail. During healing processes, absorption at the fracture occurs and it is necessary that the nail be permitted to move in response to such stresses. However, it is equally important that the nail not be permitted to move relative to the guide means under ordinary circumstances. In Patent 2,702,543 there is provided a friction ring on the nail which gives the correct frictional resistance between the nail and guide sleeve.

In practice it has been found that this frictional resistance between the nail and guide sleeve is a critical factor. It can be readily appreciated that the required amount of frictional resistance would depend upon a number of factors, such as, type of fracture and bone condition. Thus arose the need for a pin having tension or friction adjusting means which could be operated by the surgeon at the time of implant. While different sizes of friction rings can be used in connection with the prior art device previously described, this necessitates the return of the pin to the factory. Obviously, this procedure is entirely unsatisfactory under the conditions outlined above.

The present invention solves this problem by providing a hip pin with readily adjustable tension means. This means comprises a bore in the end of the pin and a tapered screw which fits within this bore, the end of the pin having longitudinal slots therein to permit expansion. Thus, by turning the screw the frictional resistance between the guide sleeve and the pin may be readily adjusted to any desired value. This procedure can be performed by a surgeon at the time of installing the pin and can even be adjusted when the pin is in place which could not be done with prior art devices.

An object of the present invention is to provide a device for fixing fractured bones with a tension adjusting means such that the frictional resistance between the guide sleeve and the nail may be readily adjusted.

Other objects and many of the attendant advantages of the present invention will become apparent upon consideration of the following detailed specification when considered in connection with the accompanying drawing wherein:

Fig. 1 is an elevational view partly in section showing the fixation device in position in a fractured bone;

Fig. 2 is an end view of the sleeve;

Fig. 3 is a cross-sectional view of the nail component showing the tension adjusting means; and Fig. 4 is an end view of the nail.

Referring now more particularly to the drawing wherein like numerals indicate like parts throughout the several views, there is shown at 1 in Fig. 1 a bone having a fracture 2. The present invention serves to retain the fractured bone segments in fixed position and includes a plate 3 having screws 4 which serve to mount the plate on one bone segment. The plate has a guide sleeve 5 suitably secured to one end thereof. As shown in Fig. 2 this guide sleeve is provided with a keyway 6 for a purpose which will become apparent hereinafter.

Slidably disposed within the sleeve 5 is a nail or pin 7 which is shown in greater detail in Figs. 3 and 4. The pin 7 has cutter elements 8 on one end thereof and these cutter elements are sufficiently sharp to permit penetration through a bone. The pin is provided with a projection 9 which is designed to cooperate with the keyway 6 in the guide sleeve to prevent rotation of the nail with respect to the guide sleeve.

That end of the pin 7 opposite to which the cutter elements 8 are applied, has a threaded bore 10 with reduced end portions 11 and 12. Into this bore there fits a tapered screw 13 and this tapered screw cooperates with the reduced end portions of the bore. As shown in Fig. 4 the end portion of the pin 7 has slots 14 therein so that as the screw 13 is brought inwardly the wall of the pin 7 will be expanded.

In use, the pin 7 is forced into the bone through the guide sleeve 5 by means of a driver element (not shown). In bone fractures it is important that the pin and sleeve be maintained in their relative positions due to the stresses encountered in ordinary usage. However, during the healing processes the bone undergoes absorption and unusual stresses are given the pin. Under these circumstances it is essential to permit relative movement between the pin and guide sleeve. The present invention provides a tensioning means between the guide sleeve and the pin which is readily adjustable at any time. By screwing the tapered screw 13 further into the bore 10 the slotted end portion of the pin 7 is forced outwardly into tighter engagement with the inner wall of the sleeve. If desired, the pin may be locked in position. This means may be adjusted by the surgeon at the time of implant and even permits adjustment of the tension after the device is in place.

Obviously, many modifications and variations of the present invention are possible in the light of the above teachings. What is claimed as new and desired to be secured by Letters Patent is:

1. In a device of the class described for the fixation of fractured bones, in combination, guide means adapted to be fixedly mounted on the fractured bone, said guide means including a sleeve, a pin slidably disposed within the sleeve, said pin adapted to be held in place by the sleeve and to extend through the fractured bone, and means for adjusting the frictional engagement between the sleeve and pin, said means including slots in one end of the pin and a tapered screw fitting in the end of the pin.

2. A surgical device for the fixation of fractured bones comprising, in combination, tube means adapted to be fixed to a portion of the fractured bone, a nail disposed within said tube means and having a portion thereof extending through the fractured bone, longitudinal slots in that end of the nail within the tube, a threaded bore within the nail end and a tapered screw fitting in said threaded bore and adapted upon tightening to increase friction between the tube and the nail.

3. A surgical device for retaining fractured bones in a preselected position comprising a tube adapted to be fixed to one bone portion, a nail having a cutter on one end thereof, a portion of the nail adapted to fit within the tube with the cutter end extending into another bone portion and means for adjusting the frictional resistance between the tube and nail comprising a bore having reduced end portions in the nail end, longitudinal slots in the nail end and means within the bore for forcing the slotted end outwardly into tighter engagement with the sleeve.

References Cited in the file of this patent

UNITED STATES PATENTS

| | | |
|---|---|---|
| 2,397,545 | Hardinge | Apr. 2, 1946 |
| 2,699,774 | Livingston | Jan. 18, 1955 |
| 2,702,543 | Pugh et al | Feb. 22, 1955 |